US007060769B2

(12) United States Patent
Angeletakis

(10) Patent No.: US 7,060,769 B2
(45) Date of Patent: Jun. 13, 2006

(54) METHOD OF CURING COMPOSITION BY METATHESIS REACTION USING REACTION CONTROL AGENT

(75) Inventor: Christos Angeletakis, Orange, CA (US)

(73) Assignee: Kerr Corporation, Orange, CA (US)

(*) Notice: Subject to any disclaimer, the term of this patent is extended or adjusted under 35 U.S.C. 154(b) by 133 days.

(21) Appl. No.: 10/430,590

(22) Filed: May 6, 2003

(65) Prior Publication Data

US 2004/0225072 A1 Nov. 11, 2004

(51) Int. Cl.
*C08F 4/80* (2006.01)
(52) U.S. Cl. .................. 526/171; 526/280; 526/281; 526/128
(58) Field of Classification Search .............. 526/171, 526/280, 281, 128
See application file for complete search history.

(56) References Cited

U.S. PATENT DOCUMENTS

| | | | |
|---|---|---|---|
| 4,717,498 A | 1/1988 | Maxon | 252/174.15 |
| 4,849,127 A | 7/1989 | Maxon | 252/174.15 |
| 5,198,511 A | 3/1993 | Brown-Wensley et al. | 526/113 |
| 5,266,670 A | 11/1993 | Nakos et al. | 528/32 |
| 5,296,566 A * | 3/1994 | Brown-Wensley et al. | 526/171 |
| 5,312,881 A | 5/1994 | Marks et al. | 526/126 |
| 5,330,948 A | 7/1994 | Marks et al. | 502/104 |
| 5,455,317 A | 10/1995 | Marks et al. | 526/126 |
| 5,491,206 A | 2/1996 | Brown-Wensley et al. | 526/126 |
| 5,728,785 A | 3/1998 | Grubbs et al. | 526/142 |
| 5,831,108 A | 11/1998 | Grubbs et al. | 556/21 |
| 5,939,504 A | 8/1999 | Woodson, Jr. et al. | 526/145 |
| 6,001,909 A | 12/1999 | Setiabudi | 524/265 |
| 6,040,363 A | 3/2000 | Warner et al. | 523/214 |
| 6,071,459 A | 6/2000 | Warner et al. | 264/311 |
| 6,075,068 A | 6/2000 | Bissinger | 523/116 |
| 6,077,805 A | 6/2000 | Van Der Schaaf et al. | 502/155 |
| 6,121,362 A | 9/2000 | Wanek et al. | 524/448 |
| 6,252,101 B1 | 6/2001 | Herzig et al. | 556/453 |
| 6,306,987 B1 | 10/2001 | Van Der Schaaf et al. | 526/171 |
| 6,310,121 B1 | 10/2001 | Woodson, Jr et al. | 524/32 |
| 6,323,296 B1 | 11/2001 | Warner et al. | 526/171 |
| 6,403,522 B1 | 6/2002 | Bolm et al. | 502/155 |
| 6,407,190 B1 | 6/2002 | Van Der Schaaf et al. | 526/171 |
| 6,409,875 B1 | 6/2002 | Giardello et al. | 156/334 |
| 6,410,666 B1 | 6/2002 | Grubbs et al. | 526/171 |
| 6,417,363 B1 | 7/2002 | Van Der Schaaf et al. | 546/6 |
| 6,455,029 B1 * | 9/2002 | Angeletakis et al. | 424/49 |
| 6,465,554 B1 | 10/2002 | Van Der Schaaf et al. | 524/403 |
| 6,525,125 B1 | 2/2003 | Giardello et al. | 524/439 |
| 6,649,146 B1 | 11/2003 | Angeletakis et al. | 424/49 |
| 6,818,586 B1 * | 11/2004 | Grubbs et al. | 502/155 |
| 2002/0071813 A1 | 6/2002 | Angeletakis et al. | 424/49 |
| 2002/0107138 A1 | 8/2002 | Hoveyda et al. | 502/152 |
| 2002/0137978 A1 | 9/2002 | Grubbs et al. | 585/507 |
| 2002/0153096 A1 | 10/2002 | Giardello et al. | 156/334 |
| 2002/0185630 A1 | 12/2002 | Piccinelli et al. | 252/184 |

FOREIGN PATENT DOCUMENTS

| | | |
|---|---|---|
| EP | 0796607 | 9/1997 |
| EP | 0771830 | 12/1999 |
| EP | 1025830 | 9/2000 |
| EP | 1241196 | 9/2002 |
| JP | 2001002719 | 1/2001 |
| JP | 2002284789 | 10/2002 |
| WO | WO 98/39346 | 9/1998 |
| WO | WO 99/00396 | 1/1999 |
| WO | WO 99/00397 | 1/1999 |
| WO | WO 99/29701 | 6/1999 |
| WO | WO 99/50330 | 10/1999 |
| WO | WO 99/60030 | 11/1999 |
| WO | WO 00/46255 | * 8/2000 |

OTHER PUBLICATIONS

Scholl et al., "Synthesis and activity of a new generation of ruthenium-based olefin metathesis catalysts coordinated with 1,3-dimesityl-4,5-dihydroimidazol-2-ylidene ligands", Organic Letters, 1(6), 953-956 (1999).*
International Organization for Standardization, *Dental Elastomeric Impression Materials*, ISO 4823 (1992).
Scholl et al., *Synthesis and Activity of a New Generation of Ruthenium-Based Olefin Metathesis Catalysts Coordinated with 1,3-Dimesityl-4,5-Dihydroimidazol-2-ylidene Ligands*, Org. Lett., vol. 1, No. 6, 953-956 (1999).
Chevalier et al., *Ring-Opening Olefin Metathesis Polymerisation (ROMP) as a Potential Cross-Linking Mechanism for Siloxane Polymers*, J. of Inorganic and Organometallic Polymers, vol. 9, No. 3, 151-164 (1999).
L. LeCamp et al., *Polydimethyl siloxane photoreticulable par voie cationique-l*, Eur. Polym. J. vol. 33, No. 9, pp. 1453-1462 (1997).
Kim et al., *Surface-Initiated Ring-Opening Metathesis Polymerization on Si/SiO2*, Macromolecules 2000, 33(8), 2793-2795.

* cited by examiner

*Primary Examiner*—Ling-Sui Choi
(74) *Attorney, Agent, or Firm*—Wood, Herron & Evans, LLP

(57) ABSTRACT

A method of controlled curing by a metathesis reaction upon mixing its components, the method including the step of mixing an olefin-containing substrate, a metathesis catalyst, and a reaction control agent. The metathesis catalyst is a ruthenium or osmium carbene complex catalyst, such as one containing an alkylidene ligand with basicity higher than that of tricyclohexylphosphine ($PCy_3$) and a neutral electron donor ligand with a basicity lower than that of $PCy_3$, whereby the catalyst initiates the metathesis reaction of the composition upon mixing with the substrate. The reaction control agent is effective to slow the progress of the metathesis reaction and prevent its completion in the absence of an elevated temperature. The control agent may be a hydrocarbon containing carbon-carbon double bonds and/or triple bonds, or maybe a modified hydrocarbon with one or more Group 14 or 15 atoms. Prior to catalyst deactivation, the mixture is exposed to an elevated temperature to accelerate the catalyst and allow the metathesis reaction to proceed toward completion.

55 Claims, No Drawings

METHOD OF CURING COMPOSITION BY METATHESIS REACTION USING REACTION CONTROL AGENT

CROSS REFERENCE TO RELATED APPLICATION

This application is related to commonly-owned U.S. patent application Ser. No. 10/430,953, now U.S. Pat. No. 6,844,409 issued Jan. 18, 2005, entitled COMPOSITION CURABLE BY METATHESIS REACTION and Ser. No. 10/430,592 entitled METATHESIS-CURABLE COMPOSITION WITH A REACTION CONTROL AGENT, both filed on May 6, 2003, and to commonly-owned U.S. patent application Ser. No. 10/010,777 filed Dec. 6, 2001 now U.S. Pat. No. 6,649,146 issued Nov. 18, 2003 and entitled DENTAL IMPRESSION MATERIAL UTILIZING RUTHENIUM METATHESIS CATALYST, which is a continuation-in-part of U.S. Pat. No. 6,455,029 issued Sep. 24, 2002 and entitled DENTAL IMPRESSION MATERIAL UTILIZING RUTHENIUM CATALYST, the disclosures of which are incorporated herein by reference in their entirety as if completely set forth herein below. This application is also related to commonly-owned, U.S. patent application Ser. No. 10/313,359, now U.S. Pat. No. 6,861,386 issued Mar. 1, 2005, which claims the benefit of Provisional U.S. Patent Application Ser. No. 60/338,439 filed Dec. 6, 2001, both entitled ACCELERATOR FOR METATHESIS CATALYST, the disclosures of which are incorporated herein by reference in their entirety as if completely set forth herein below.

FIELD OF THE INVENTION

This invention relates to a method for curing compositions that undergo a metathesis reaction initiated by a metathesis catalyst, the method using a reaction control agent for controlling the progress of the metathesis reaction and an elevated temperature cure to complete the reaction. More specifically, the control agent slows the progress of the metathesis reaction, and depending on the nature of the control agent, may prevent completion of the reaction until the composition is exposed to temperatures higher than the mixing temperature.

BACKGROUND OF THE INVENTION

Addition polymerizable silicone resins are widely used in many fields such as electronics, health care and automotive applications. The polymerizable resins are cured as a two-part system using a hydrosilation reaction. A platinum catalyst is used in one part, the catalyst side, and a hydrogen terminated polydimethylsiloxane (HPDMS) in the other part, the base side, while both sides contain vinyl terminated polydimethylsiloxanes (PVDMS) resins. When these materials are cured at room temperature, they are referred to as room temperature vulcanized (RTV). The most common RTV materials are typically offered as a 10:1 ratio base/catalyst, such as RTV630 (GE Silicones), while some other RTV materials are offered at a 1:1 ratio, such as RTV6428 (GE Silicones). Various working times are required depending on the application from 2 minutes to several hours and may involve a heat curing step above ambient temperature. The working time is controlled with a retarder or inhibitor mixed with the catalyst component, such as an amine or acetylenic compound.

Another class of addition polymerizable silicone resins are the liquid silicone rubber (LSR) materials prepared through the liquid injection molding (LIM) process. The LSR materials are cured at a temperature of 120° C.–180° C. in a mold injected to after mixing. The mixture includes a retarder mixed with the catalyst component, such as an amine or acetylenic compound, that allows the hydrosilation reaction to occur at the mold temperature only.

Both the RTV and LSR types of formulations suffer from the shortcomings of the hydrosilation mechanism. These shortcomings include: (1) deactivation of the platinum catalyst by sulfur or other nucleophilic impurities; (2) high shrinkage, approximately 1%, due to the high reduction of free volume upon polymerization; (3) high cost of platinum metal needed for catalysis; (4) high cost of HPDMS and PVDMS resins; (5) requirement of two different resins to be employed, namely vinyl and hydrogen terminated; (6) undesirable hydrogen evolution from the decomposition of the hydrosiloxane cross-linkers that typically are present in these systems; and (7) vinyl functionalized PDMS resins have a low hydrocarbon content in the main chain after polymerization due to the presence of only an ethyl spacer, which leads to a relatively high dielectric constant, which is an undesirable property for some electronic applications.

A new type of polymerization system has been recently developed that may potentially be used to replace addition-curable silicones and platinum catalysts in a wide variety of applications to thereby avoid the shortcomings of the hydrosilation mechanism discussed above. In this new metathesis reaction system, curing is achieved by a ring-opening metathesis polymerization (ROMP) mechanism. Metathesis is generally understood to mean the metal catalyzed redistribution of carbon-carbon double bonds. The polymerizable composition comprises a resin system that includes functionalities or groups that are curable by ROMP together with a metathesis catalyst, such as a ruthenium carbene complex. However, to efficiently utilize ROMP to prepare polymers, there is a need for a method of curing in which the progress of the metathesis reaction is controlled and proceeds to completion only upon the application of an elevated temperature, which method is particularly useful for molding applications.

In addition to ROMP, other metathesis reaction systems utilize metathesis catalysts, for example ring closing metathesis, acyclic diene metathesis polymerization, ring opening metathesis and cross metathesis. There is further a need for a curing method that controls the progress and completion of the reaction in these other metathesis reaction systems.

In addition to silicone resins, another thermoset monomer type that is curable by ROMP is the cycloolefins, such as dicyclopentadiene (DCPD). These resins are usually molded, and there is thus a further need for a curing method that controls the progress and completion of the metathesis reaction for this monomer type.

SUMMARY OF THE INVENTION

The present invention provides a method of curing a composition that upon mixing of its components undergoes a metathesis reaction, wherein the method includes mixing components into the composition that control and catalyze the metathesis reaction, but prevent completion of the reaction at the mixing temperature. The method includes mixing together a metathesis-curable olefinic substrate, a ruthenium or osmium carbene complex catalyst that is effective to initiate the metathesis reaction, such as ring-opening metathesis polymerization (ROMP), and a reaction control agent for slowing the progress of the reaction. The catalyst may have the following structure:

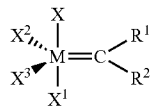

wherein:

M is ruthenium or osmium,

X is an alkylidene ligand with basicity higher than that of tricyclohexylphosphine (PCy$_3$), $X^1$ is a neutral electron donor ligand with a basicity lower than that of tricyclohexylphosphine, $X^2$ and $X^3$ are either the same or different and are any anionic ligand, and $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted. In an exemplary embodiment of the present invention, the catalyst has the following structure:

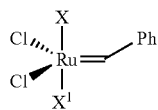

wherein Ph is phenyl, X is an alkylidene, such as a saturated imidazolidene, having a basicity (proton affinity) higher than tricyclohexylphosphine (PCy$_3$), and $X^1$ is a phosphine, phosphite, phosphinite, or phosphonite whose basicity is lower than that of PCy$_3$. In a further exemplary embodiment, $X^1$ is a phosphine of the formula PR$^3$R$^4$R$^5$ where $R^3$, $R^4$, and $R^5$ are alkyl, aralkyl or aryl.

The method uses a reaction control agent to slow the progress of the metathesis reaction. The control agent allows the composition to be cured after a certain delayed time after mixing (work time or pot life) and allows for acceleration of the rate of the metathesis reaction toward completion only by heating to temperatures at least 30° C. above the mixing temperature at any time during the work time period. The control agent, and the amount thereof, also allows for control of the viscosity build up rate as the metathesis reaction proceeds, which is useful for many molding applications. The reaction control agent is a hydrocarbon with one or more carbon-carbon double bonds and/or triple bonds or a modified hydrocarbon with one or more Group 14 and/or 15 heteroatoms. These hydrocarbons may optionally further contain oxygen and/or sulfur atoms and the heteroatoms may also be bonded to one or more hydrocarbon fragments containing double bonds and/or triple bonds. Advantageously, the double and triple bond groups are allyl (2-propenyl), vinyl (ethenyl), ethynyl or propargyl (2-propynyl) groups. Also advantageously, the reaction control agent includes more than one double or triple bond group. In an exemplary embodiment of the invention, the reaction control agent is tetraallyl silane (TAS):

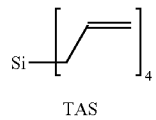

The catalyst and the reaction control agent are mixed with an olefinic substrate to initiate the metathesis reaction with a controlled rate. By way of example, the olefinic substrate may be a polysiloxane end-capped with cycloalkenyl groups that are capable of undergoing a metathesis reaction. In another embodiment, for preparation of thermoset polymers, cycloolefins such as dicyclopentadiene (DCPD) can be used. In yet another embodiment, norbornenylethyl terminated and tethered polydimethylsiloxane resins are used.

DETAILED DESCRIPTION

The present invention provides a method of curing a composition by a metathesis reaction wherein a ruthenium or osmium carbene complex is mixed together with a reaction control agent to allow control of the progress of the metathesis reaction on an olefin-containing substrate, and the composition is subjected to thermal activation to accelerate the rate of the metathesis reaction to allow the reaction to proceed toward completion.

The catalysts useful in the method of the present invention include ruthenium or osmium carbene complexes. The catalyst may have the following structure:

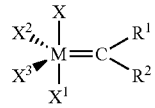

wherein:

M is ruthenium or osmium,

X is an alkylidene ligand with basicity higher than that of tricyclohexylphosphine (PCy$_3$), $X^1$ is a neutral electron donor ligand with a basicity lower than that of tricyclohexylphosphine, $X^2$ and $X^3$ are either the same or different and are any anionic ligand, and $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

One example of such catalyst, the parent benzylidene ruthenium complex 1, with the following structure, exhibits good air and water stability:

1

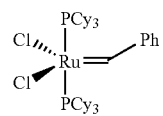

wherein Ph is phenyl, and Cy is cyclohexyl.

The ring-opening metathesis activity and air stability of the parent complex 1 can be increased by substituting an alkylidene ligand X, such as a saturated imidazolidine ligand, for one of the tricyclohexylphosphine ligands, in accordance with the following formula:

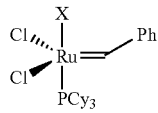

The ligands X may be 4,5-dihydroimidazol-2-ylidenes, which have the following general structure:

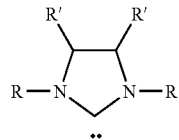

These substituted alkylidene ligands X have a basicity or proton affinity higher than that of tricyclohexylphosphine, which is believed to contribute to the higher activity and higher air stability. A derivative of complex 1 containing the alkylidene 1,3-bis(2,4,6-trimethylphenyl)-imidazol-2-ylidene (sIMES) ligand is shown here:

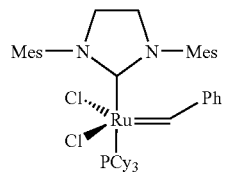

2 wherein Mes is mesityl (2,4,6 trimethylphenyl). Other 4,5-dihydroimidazol-2-ylidenes can also be used to afford ruthenium carbene complexes 3 and 4 having the following structures:

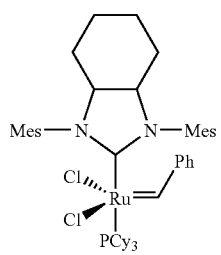

3

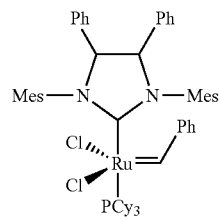

4 wherein Mes is mesityl, Ph is phenyl, and Cy is cyclohexyl.

To achieve a longer working time (pot life) and improve compatibility with reaction control agents, tricyclohexylphosphine ($PCy_3$) is substituted with a neutral electron donor ligand $X^1$ with a lower basicity (as expressed by the pKa) or proton affinity than $PCy_3$ as shown below:

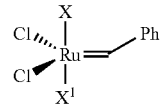

Examples of compound types that can be used as neutral electron donor ligands are: phosphines, phosphites, phosphinites or phosphonites. In an exemplary embodiment, $X^1$ is a phosphine of the formula $PR^3R^4R^5$ where $R^3$, $R^4$, and $R^5$ are alkyl, aralkyl or aryl, with a basicity lower than that of $PCy_3$. In a further exemplary embodiment, $R^3$, $R^4$, and $R^5$ are n-butyl, such that $X^1$ is tri-n-butylphosphine ($PBu_3$), and X is sIMES as shown below as structure 5:

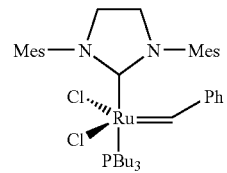

5

The method further comprises mixing a reaction control agent with the catalyst and olefinic substrate. After mixing of the composition components, the catalyst initiates the metathesis reaction while the control agent slows the progress of the metathesis reaction, and thereby allows for an increase in the time period before cure, or before the metathesis reaction proceeds to completion or to a desired extent short of completion. The length of this time period, also called work time or pot life, is controlled by preventing completion of the reaction until the composition is heated to a temperature at least 30° C. above the mixing temperature. By way of example, the composition components may be mixed at ambient temperature, followed by heat curing at 60° C. or greater, such as 100° C. or 150° C. By way of further example, the composition components may be mixed at sub-ambient temperatures (at least 30° C. below ambient), followed by raising the temperature to at least ambient to complete the reaction. The reaction control agent also allows for control of the viscosity build up as the metathesis reaction proceeds, which is useful for many molding applications.

The reaction control agent is an organic compound that falls within two categories. The first category of control agents includes modified hydrocarbons with one or more heteroatoms selected from Group 14 or 15 of the periodic table. Group 14 currently includes C, Si, Ge, Sn, and Pb, though C is understood to be excluded by definition of a heteroatom. Group 15 currently includes N, P, As, Sb and Bi. A heteroatom is understood to refer to an atom other than carbon or hydrogen in an organic compound. The modified hydrocarbon may optionally further contain oxygen or sulfur atoms. Also, optionally, the heteroatoms may be bonded to one or more hydrocarbon fragments containing a double or triple bond, for example, allyl, vinyl, ethynyl and propargyl-containing fragments. Examples of modified hydrocarbons with Group 14 heteroatoms include 1,3,5,7-tetravinyl-1,3,5,7-tetramethylcyclotetrasiloxane and 5-(trimethylsilyl)-1,3 cyclopentadiene. Examples of modified hydrocarbons with Group 15 heteroatoms include 4-vinyl pyridine, triphenyl phosphine and tricyclohexyl phosphine. Another example of modified hydrocarbons with Group 14 heteroatoms include those having carbon-carbon double bonds and/or triple bonds and one or more central Group 14 atoms, and can further contain, in the case of silicon as the central atom(s), oxygen atoms connected to silicon to form siloxane bonds. In this embodiment, the reaction control agent has the structure shown below:

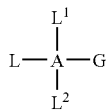

wherein:

G is selected from the group consisting of: $L^3$,

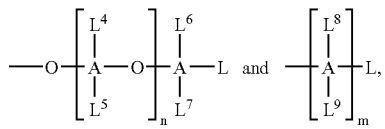

L is a hydrocarbon fragment containing a double or triple bond;

$L^1$–$L^9$ are each independently selected from the group consisting of L, alkyl, aryl, aralkyl or haloalkyl;

A is a Group 14 heteroatom;

n=0–20; and m=0–20.

Of the Group 14 atoms, which include Si, Ge, Sn and Pb (excluding C), the central atom is advantageously Si, Ge or Sn, and more advantageously Si.

In one embodiment, G=$L_3$ such that the reaction control agent is a tetracoordinated compound having at least one substituent group L that is a hydrocarbon fragment containing a double or triple bond. Allyl and vinyl groups are hydrocarbon fragments containing a double bond, for example, and alkynyl groups, such as propargyl and ethynyl groups, are hydrocarbon fragments containing a triple bond, for example. For the other substituent groups $L^1$, $L^2$, $L^3$, if not a hydrocarbon fragment containing a double or triple bond, then the substituent group is an alkyl, aryl, aralkyl or haloalkyl group, which are essentially inert to the metathesis reaction. Thus, it is the hydrocarbon fragment containing the double or triple bond that determines the extent of the retardation of the metathesis reaction, such that a greater number of such hydrocarbon fragments would be expected to achieve longer working times than similar structures containing fewer of such hydrocarbon fragments. An exemplary inert substituent is the methyl group. Examples of control agents of this embodiment include tetraallylsilane, tetraallylstannane, allyltrimethyl silane, ethynyltrimethyl silane, tetravinylsilane, and vinyl trimethylsilane.

In the embodiment where G is defined as:

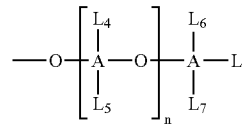

the central atom A is Si, such that the reaction control agent contains a straight chain siloxane compound in which the ends of the chain are capped by hydrocarbon fragments containing a double or triple bond. The substituent groups within the chain (i.e., $L^1$, $L^2$, $L^4$, $L^5$, $L^6$, $L^7$) may also be hydrocarbon fragments containing double or triple bonds or may be an inert substituent including alkyl, aryl, aralkyl or haloalkyl groups. By way of example, where A is silicon and n=0, a disiloxane compound is formed, such as divinyltetramethyldisiloxane.

In the embodiment where G is:

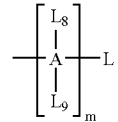

a structure is formed having a chain of single-bonded Group 14 atoms where the ends of the chain are capped by hydrocarbon fragments containing a double or triple bond. As with the previous embodiment, the substituent groups within the chain (i.e., $L^1$, $L^2$, $L^8$, $L^9$) may be either the hydrocarbon fragment with the double or triple bond or may be an inert alkyl, aryl, aralkyl or haloalkyl group. Where m=2, for example, a 3 atom chain is formed with 2 hydrocarbon fragment double or triple bond end groups and 6 $L^1$–$L^9$ substituent groups.

The second category of reaction control agents include hydrocarbons containing one or more double or triple bond functional groups, for example, allyl, vinyl, ethynyl or propargyl groups. The hydrocarbon may optionally further contain sulfur and/or oxygen atoms. Examples of these hydrocarbons include trimethylolpropane diallyl ether, diallyl phthalate, glyoxyl bis(diallyl acetal), pentaerythritol triacrylate and $C_{14}$ diol dimethacrylate.

In the method of the present invention, the metathesis reaction is initiated upon mixing of the composition components, but the progress of the reaction is slowed by the presence of the reaction control agent. While the composition remains at the mixing temperature, the metathesis reaction proceeds slowly and the viscosity build up is gradual. Upon exposing the composition to an elevated temperature at least 30° C. greater than the mixing temperature, the catalyst is further activated to accelerate the rate of the metathesis reaction and allow the metathesis reaction to proceed toward completion. However, if the composition remains at the mixing temperature beyond a certain time, the catalyst may become deactivated, such that it no longer has the potency to complete the metathesis reaction upon application of the elevated temperature. Thus, in the method of the present invention, exposure to the elevated temperature is carried out prior to deactivation of the catalyst. The time at which the catalyst will deactivate will vary for different reaction control agents. The hardness after the elevated temperature curing step is indicative of the potency of the catalyst. A hardness of 0 after the elevated temperature curing step indicates that a complete deactivation of the catalyst occurred prior to the heat treatment.

The method further comprises mixing the catalyst and control agent with an olefin-containing substrate (compound or mixture of compounds), such as a cycloolefin-containing compound or mixture of compounds or an acyclic olefin-containing compound or mixture of compounds, to initiate the metathesis reaction, such as ROMP. Advantageously, for a composition curable by ROMP, the compound or mixture of compounds comprises at least one cyclic olefin functionalized majority (>50%) siloxane oligomer or polymer that is telechelic, tethered, tri-functional and/or quadri-functional. More specifically, the compound or mixture of compounds curable by ROMP may comprise one or a combination of the following: a polymerizable telechelic siloxane-based polymer end-capped with an olefin group curable by ROMP; a polymerizable siloxane-based polymer tethered and end-capped with an olefin group curable by ROMP; a polymerizable tri-functional siloxane-based oligomer or polymer end-capped with an olefin group curable by ROMP; and a polymerizable quadri-functional siloxane-based oligomer or polymer end-capped with an olefin group curable by ROMP. The olefin groups may be cycloalkenyl groups, for example norbornenyl or norbornenylethyl groups. The cycloalkenyl functionalized PDMS resins that are cured via ROMP have a higher hydrocarbon content than the vinyl functionalized PDMS resins that are used in hydrosilation reactions. The higher hydrocarbon content leads to a lower dielectric constant, which is desirable for many electronic applications.

In addition to the above category of oligomers and polymers, the olefin-containing substrate may comprise any other cycloalkenyl-functionalized oligomers or polymers that may undergo polymerization via ROMP mechanism, such as reactive cycloolefins, for example DCPD. Acyclic olefin-functionalized compounds that may undergo acyclic diene metathesis polymerization are also contemplated.

The method of the present invention contemplates forming a catalyst paste and a base paste that upon mixture with one another, form a curable paste/paste system in which the metathesis reaction proceeds. Generally, in this system, the catalyst paste comprises the metathesis catalyst for initiating polymerization, and a solvent for the catalyst that is miscible or dispersible with the base paste and that does not interfere with the metathesis reaction. The solvent may be, for example, 3-phenyl-heptamethyl-trisiloxane. Another exemplary solvent is a partially phenyl substituted poly(dimethylsiloxane), such as Dow Corning fluid 556. The base paste generally comprises the olefin-containing substrate that is curable via ROMP or other metathesis reaction, and the reaction control agent. The composition may further include filler systems and/or optional additives suitable for the particular application, such as pigments or surfactants, that do not interfere with the reaction.

The method of the present invention may be used to replace curing methods using the hydrosilation reaction system of platinum catalysts and dual resin systems. The metathesis reaction is a homo-reaction using a single resin system, which simplifies the formulation, for example using the NBE-functionalized PDMS resins in combination with a ruthenium carbene complex catalyst. The method of the present invention enables easy formulation and curing of RTV materials, for example, a material similar to RTV6428 (GE Silicones, Waterford, N.Y.), as set forth in Example 1 below, because the viscosity range and working time characteristics are similar to those materials.

The reaction control agent is incorporated into the base paste, to slow the ROMP mechanism upon mixing of the catalyst paste and base, thereby increasing the working time of the resin before cure, and to prevent completion of the ROMP mechanism in the absence of an elevated temperature above the mixing temperature. While numerous retarders are known for use with the platinum catalysts in the hydrosilation mechanism, unexpectedly, some of the most common of them are not effective with the ruthenium carbene catalysts in the ROMP mechanism. However, tetraallyl silane (TAS), for example, has been found to provide significantly increased working time, particularly with catalyst 5. Similarly, other modified hydrocarbon compounds having a Group 14 or 15 heteroatom and optionally one or more carbon-carbon double and/or triple bonds have also been found to be effective, as explained further, below, as well as hydrocarbons without the Group 14 or 15 heteroatom but containing one or more double and/or triple bonds.

EXAMPLE

Resins 1 and 2 were formulated to provide similar properties to that of the commercial RTV silicon marketed by GE, referred to as RTV6428. While RTV6428 is mixed with a 1:1 base/catalyst ratio, Resins 1 and 2 were mixed with a 10:1 ratio. A telechelic polydimethylsiloxane (PDMS) end-capped with norbornenylethyl groups was used in the base paste, with n=243 as shown below:

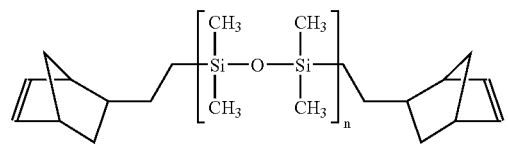

The base paste formulation is provided below in Table 1:

TABLE 1

| Base Paste Composition (wt. %) | |
|---|---|
| PDMS resin end-capped with norbornenylethyl groups | 71 |
| Hexamethyldisilazane treated Crystalline silica | 9 |
| Sub-micron hydrophobic Silica | 20 |
| Total | 100 |

The catalyst used in the catalyst paste is $PCy_3$ substituted ruthenium carbene complex (2) for Resin 1 and the $PBu_3$ substituted ruthenium carbene complex (5) for Resin 2, each obtained from Materia, Inc., Pasadena, Calif. The catalyst component was formulated by dissolving it in a partially phenyl substituted polymethylsiloxane, in particular, Dow Corning Fluid 556. The catalyst paste formulation is provided in Table 2:

TABLE 2

Test Catalyst Paste Composition (wt. %)

| | |
|---|---|
| Dow Corning Fluid 556 | 36.05 |
| Calcium Silicate Wollastonite (2–10 μm) | 53.70 |
| Sub-micron Silica | 10 |
| Catalyst Complex 2 or 5 | 0.25 |
| Total | 100 |

The base paste and catalyst paste were mixed at ambient temperature. The physical properties for Resins 1 and 2 and the commercial RTV6428 composition are provided in Table 3. Also provided in Table 3 are the properties of two other 10:1 commercial RTV materials, RTV630, marketed by GE Silicones (Waterford, N.Y.) and V-2330 marketed by Rhodia (Troy, N.Y.).

TABLE 3

Physical Property Comparison of Short Working Time Silicones

| | RTV6428 | RTV630 | V-2330 | Resin 1 | Resin 2 |
|---|---|---|---|---|---|
| Catalyst | Pt-based | Pt-based | Pt-based | 2 | 5 |
| Mixing Ratio | 1:1 | 10:1 | 10:1 | 10:1 | 10:1 |
| Viscosity of Base (Pa.s) | 0.88 | 113 | 14.8 | 19.6 | 19.6 |
| Working Time WT (h,m,s) | 1 m, 34 s | 2 h, 30 m | 10 m | 1 m, 28 s | ~10–30 m |
| Set time ST (h,m,s) | 2 m, 43 s | 6 h, 30 m | 1 h, 10 m | 3 m, 20 s | 5 h, 30 m |
| Tensile Strength (MPa) | 3.57 | 6.27 | 2.89 | 3.47 | 2.16 |
| | (0.30) | (0.18) | (0.77) | (0.40) | (0.36) |
| Elongation (%) | 85 (6) | 299 (24) | 325 (52) | 244 (16) | 235 (4) |
| Hardness, Shore A (100° C.) | 62 | 54 | 29 | 37 | 36 |
| Tear Strength (N/mm) | 3.3 | 12.3 | 12.37 | 5.49 | 4.62 |
| | (0.4) | (2.2) | (0.51) | (0.06) | (0.47) |

The Resin 1 and RTV6428 compositions provide similar working times and set times, as well as tensile strength. The compositions have different elongation, hardness and tear strength, which may be attributed to the type of filler and the extent of filler loading. The data in Table 3 suggests that catalyst 5 is far more sluggish at room temperature than catalyst 2, but affords materials with the same hardness. Thus, a straight chain $C_4$ alkyl phosphine is less active than a cyclic $C_6$ alkyl phosphine, such that longer working times may be achieved by limiting the phosphine ligands to acyclic $C_1$–$C_5$ alkyls. Thus, for applications desiring longer working times, a composition of the invention containing ruthenium carbene complex 5 having the tributylphosphine ligand provides advantageous results compared to a composition containing complex 2. However, the RTV630 composition still provides longer work and set times than Resin 2.

By using reaction control agents in the formulation, it is believed that longer working times, up to several hours, can be achieved at room temperature prior to curing at elevated temperature. Also, some reaction control agents may be used to allow deactivation only below 120° C. to enable the composition's use as an LSR material. As discussed in the Background of the Invention, RTV and LSR materials cured by the hydrosilation reaction used a retarder mixed with the catalyst component, such as an amine or acetylenic compound, to control the working time and/or to allow the hydrosilation reaction to occur at the mold temperature only. Some of the retarders used with the hydrosilation mechanism were investigated to determine their effectiveness as reaction control agents with the ROMP mechanism, specifically compounds 11, 14 and 15 in Table 4 below. Resin 2 containing catalyst 5 with the tributylphosphine ligand was used as the control resin, with 0% retarder. In each of the test resins, 0.14 mg/g concentration of reaction control agent was added to the base paste, and the weight percent of the resin was reduced by an equivalent amount. Unexpectedly, it was found that the commonly used retarders listed above for hydrosilation are ineffective in ROMP-cured RTV and LSR materials. However, one reaction control agent, specifically tetraallyl silane (TAS) at a concentration of 0.14 mg/g, had a remarkable effect on the working time, delaying it from about 31 minutes (Resin 2) to about 4½ hours. The working time at room temperature (RT) and the Shore A hardness after thermal treatment of the cured resins is provided in Table 4. Working time was determined by inserting a plastic stick into the paste and measuring the time at which the stick was no longer able to manipulate the paste and at which the stick could be removed from the paste without any appreciable amount of paste adhering to the stick.

TABLE 4

| Reaction Control Agent (RCA) | RCA Mol. Wt. | RCA mm/g resin | Working Time WT (RT)** | Shore A Hardness (after oven cure*) |
|---|---|---|---|---|
| Control-Resin 2 | — | — | ~10–30 min | 35 |
| Tetravinyl silane (2) | 136.77 | 0.00102 | ~1 h | 28 |
| 1,5,7-Tetravinyl-1,3,5,7-tetramethylcyclotetrasiloxane (3) | 344.66 | 0.00041 | ~30 min | 30 |
| Vinyltrimethylsilane (4) | 100.24 | 0.00140 | ~40 min | 38 |
| Vinylpentamethyldisiloxane (5) | 174.39 | 0.00080 | ~50 min | 37 |

TABLE 4-continued

| Reaction Control Agent (RCA) | RCA Mol. Wt. | RCA mm/g resin | Working Time WT (RT)** | Shore A Hardness (after oven cure*) |
|---|---|---|---|---|
| Tetraallyl silane (TAS, 6) | 192.37 | 0.00073 | ~4 h 30 min | 36 |
| Divinyltetramethyldisiloxane (7) | 186.4 | 0.00075 | ~30 min | 35 |
| Ethynyl TriMethylSilane (8) | 98.22 | 0.00143 | ~14 min | 37 |
| Allyl TriPhenylSilane (9) | 300.48 | 0.00047 | ~18 min | 36 |
| PentaErythritol Triacrylate (10) | 298.3 | 0.00047 | ~12 min | 37 |
| 1-Ethynyl-1-CycloHexanol (11) | 124.18 | 0.00113 | ~17 min | 0 |
| $C_{14}$ Diol Dimethacrylate (12) | 338.49 | 0.00041 | ~10 min | 38 |
| Pyridine (13) | 79.1 | 0.00177 | ~20 min | 36 |
| TriEthylAmine (14) | 101.1 | 0.00138 | ~12 min | 38 |
| Benzotriazole (15) | 119.1 | 0.00118 | ~1 h 30 min | 8 |

*Cured in oven at 100° C. for one hour after the onset of working time. A zero value for hardness indicates a failure of the paste to cure, thereby indicating deactivation of the catalyst.
**Because the working time was tested by a manual method, the results are only accurate to +/− 10% of the value of the WT given, and the results are particularly inaccurate in the case of quick curing compositions, such as the control resin.

With the exception of TAS (6), some of the known retarders had little to no effect on slowing the ROMP reaction and some even appeared to act as weak accelerators. Not only did the addition of a small quantity of TAS drastically increase the working time, but it did so without affecting the hardness of the cured resin. Benzotriazole, commonly used with the hydrosilation reaction, was not effective due to its inability to harden (cure) even after exposure to elevated temperature for one hour. From the results of Table 4, it would appear that structures containing multiple allyl groups are more effective than analog structures containing multiple vinyl groups.

The TAS reaction control agent was also tested with Resin 1, which includes catalyst 2 with the tricyclohexylphosphine ligand. A concentration of 2.8 mg/g TAS only resulted in a working time of 2 hrs and 40 mins. Higher concentrations did not result in a cure when placed at 100° C. within 1 hr of mixing. Thus, the TAS control agent is particularly effective with the ruthenium carbene catalyst having an acyclic $C_1$–$C_5$ alkyl phosphine, such as a tributylphosphine ligand.

Some of the reaction control agents from Table 4 were also tested at a higher concentration of 0.7 mg/g, to further investigate their effect on slowing the progress of the metathesis reaction. The results are shown below in Table 5. Again, Resin 2 was used, substituting the reaction control agent for an equivalent amount of the PDMS resin.

Again, the TAS (6) reaction control agent has a remarkable effect on the ROMP reaction by catalyst 5, slowing it considerably, to provide a working time with the resin of 48 hours.

Given the remarkable effectiveness of the TAS control agent with catalyst 5, additional testing was performed. In particular, the TAS structure contains a central tetracoordinated silicon atom with the substituent groups being hydrocarbon fragments containing a double bond. Analog vinyl structures were also tested to further investigate the effect of the double bond. Potential reaction control agents were investigated having less than 4 allyl or vinyl substituents with the remaining substituents being inert groups, such as methyl. Similarly, hydrocarbon fragments containing a triple bond rather than a double bond were also investigated, in particular ethynyl and propargyl (2-propynyl) groups, which are examples of alkynyl groups. In addition to silicon as the central atom, tin was also tested to investigate the effectiveness of other Group 14 central atoms, wherein Group 14 refers to the 1988 IUPAC system for identifying groups in the periodic table. Group 14 includes silicon, germanium, tin and lead (excluding carbon). In addition to a sole central atom, straight chain groups containing Group 14 atoms are also contemplated, in particular, siloxane chains and single-bonded Group 14 chains end functionalized with the hydrocarbon fragments. Modified hydrocarbons containing Group 14 heteroatoms, as well as Group 15 heteroatoms, were also

TABLE 5

| Reaction Control Agent (RCA) | RCA Mol. Wt. | RCA mm/g resin | Working Time WT (RT) | Shore A Hardness (after oven cure*) |
|---|---|---|---|---|
| Control-Resin 2 | — | — | ~10–30 min | 35 |
| Tetraallyl silane (TAS, 6) | 192.37 | 0.00364 | ~48 h | 25** |
| Ethynyl TriMethylSilane (8) | 98.22 | 0.00713 | ~40 min | 36 |
| Allyl TriPhenylSilane (9) | 300.48 | 0.00233 | ~70 min | 35 |
| PentaErythritol Triacrylate (10) | 298.3 | 0.00235 | ~50 min | 36 |
| C14 Diol Dimethacrylate (12) | 338.49 | 0.00207 | ~35 min | 37 |

*Material was placed in an oven at 100° C. for one hour after the onset of working time.
**For TAS, Shore A hardness at 24 h is 34 at 100° C. and 35 at 150° C. Shore A hardness at 48 h is 35 at 150° C.

tested with the double and/or triple bond groups being optional. These modified hydrocarbons also include sulfur or oxygen atoms as an optional heteroatom. Hydrocarbons containing double and/or triple bond groups were also investigated without having the Group 14 or 15 atom. Sulfur and oxygen were optional components for these hydrocarbons, as well. The compounds containing various functional groups that may act as reaction control agents were tested at the same molar concentration (0.036 mm/g) in order to keep the molar ratio of control agent to catalyst constant at 24.3. The results are provided in Table 6.

TABLE 6

| Reaction Control Agent | Working Time WT (RT) | Shore A after 100° C. for 1 hour at WT |
|---|---|---|
| Control-Resin 2 | ~10–30 min | 35 |
| Vinyl Compounds | | |
| Tetravinyl silane (2) | 2 h | 26 |
| 1,3,5,7-Tetravinyl-1,3,5,7-tetramethylcyclotetrasiloxane (3) | 40 min | 26 |
| Vinyltrimethylsilane (4) | 1 h | 36 |
| Vinylpentamethyldisiloxane (5) | 10 min | 37 |
| Divinyltetramethyldisiloxane (7) | 5 h | 32 |
| 5-(Trimethylsilyl)-1,3 cyclopentadiene | 15 min | 37 |
| Allyl Compounds | | |
| Tetraallyl silane (TAS, 6) | 48 hrs | 35 |
| Allyltrimethyl silane | 1 hr | 35 |
| Tetraallyl stannane | ~25 hrs | 32 |
| Trimethylolpropane diallyl ether | 27 min | 31 |
| Diallyl phthalate | 24 h | 27 |
| Glyoxal bis(diallyl acetal) | ~20 h | 35 |
| Acrylate and Methacrylate Compounds | | |
| PentaErythritol Triacrylate (10) | 50 min | 34 |
| $C_{14}$ Diol Dimethacrylate (12) | 35 min | 36 |
| Ebecryl ® 350 Silicon Dimethacrylate* | 35 min | 36 |
| Alkynyl Compounds | | |
| Ethynyltrimethyl silane (8) | 2 hrs, 20 min | 30 |
| Propargyltrimethyl silane | ~26 hrs | 36 |
| Amines | | |
| N,N,N',N'-Tetraallyl Ethylenediamine | ~66 h | 0 |
| 4,4'-Bipyridyl | 40 min | 40 |
| Pyridine (13) | 30 min | 35 |
| 4-Vinyl pyridine | 2 h 30 min | 36 |
| Quinazoline | 20 min | 39 |
| Quinoline | 30 min | 37 |
| Ebecryl ® P-115 Acrylated amine* | 20 min | 36 |
| 4-Dimethylaminopyridine (DMAP) | 40 min | 39 |
| Phosphines | | |
| TriPhenyl Phosphine | ~20 h | 34* |
| Tricyclohexyl Phosphine | ~20 h | 39* |

*UCB Chemicals, Smyrna, GA

As the results of Table 6 show, the control agent TAS (6) containing multiple allyl groups is the most efficient at slowing the metathesis reaction. However, there were a broad variety of compound types tested as reaction control agents, as listed in Table 6. Comparing the results of the ethynyl- and propargyl-trimethyl silanes to the vinyl- and allyl-trimethyl silanes, it would appear that in analog structures triple bonds may be more efficient at slowing the metathesis reaction than corresponding double bonds. In general terms, with the silane series, the propargyl (2-propynyl) functional group is the strongest followed by the allyl group (2-propenyl), while the vinyl group is the weakest.

The presence of more than one unsaturated group in the silane derivative also increases the control effect, as indicated by comparing the results obtained by tetraallyl silane with the results obtained by allyltrimethylsilane. Substituting the Si atom in the TAS with another Group 14 atom, such as Sn, to afford tetraallylstannane also gives substantial reaction slowing. Good retarding activity is obtained in the case of diallyl phthalate and glyoxal bis(diallyl acetal), indicating that oxygen bonded allyl groups can also be effective. Aside from the vinyl group-containing 4-vinyl pyridine, which has a weak effect, the amines did not seem to have an effect, even with the presence of an allyl group, as was the case with N,N,N'N'-tetraallyl ethylenediamine, where the composition could not be cured. However, it is noted that further testing is needed to determine whether the catalyst was deactivated upon mixing with the reaction control agent or whether there is a delayed time after mixing at which the catalyst deactivates, such that elevated cure can be achieved, in accordance with the method of the present invention, prior to expiration of that delayed time. The acrylates had only a weak effect, which is believed to be due to the electron withdrawing effect of the carbonyl attached to the double bond. The two phosphines tested have a significant slowing effect on the metathesis reaction even though they do not contain any unconjugated double or triple bonds. It may be inferred in this case that the phosphines can act as substitute ligands on the metal atom of the catalyst and therefore operate under a separate mechanism for modifying the rate of reaction than what is described for the other compound types above.

Based on the above, it can be expected that a Group 14 tetra-coordinate central atom bonded to hydrocarbon fragments containing double bonds will have high retarding activity, and this activity will be increased in the order 2-propynyl>2-propenyl>>ethynyl>ethenyl (vinyl). Also the retarding activity will be higher for higher numbers of unsaturated groups present. Group 15 tri-coordinate compounds, such as phosphines, appear to have substantial retarding activity even in the absence of unconjugated double bonds. It can be inferred then that in the general case of phosphines, arsines and stibines there is an electron pair available on the heteroatom which is expected to act as an electron donor to the metal center and therefore affect its reactivity to metathesis.

We also measured the viscosity of the paste mixture containing TAS as it varied with time after mixing at ambient temperature. The hardness was measured at each time interval, after curing for 1 hr. at 100° C. The results are shown in Table 7.

TABLE 7

| Time | Viscosity (Pa · s) | Shore A Hardness (100° C.) |
|---|---|---|
| Immediately After Mixing | 26 | 25 |
| 24 h After Mixing | 28 | 34 |
| 48 h After Mixing | 119 | 25 |
| 96 h After Mixing | 190 | 0 |
| Control (no TAS) Immediately After Mixing | 11 | 36 |

From the data in Table 7, it can be concluded that the viscosity build up with TAS is gradual and that the mixture can only be cured by heat within a certain time window. In other words, the metathesis reaction must be completed by heat curing before the catalyst loses its potency to metathesize the olefinic substrate, i.e., before the catalyst deactivates. In the case of TAS, the catalyst deactivates at some period between 48 and 96 hrs. after mixing. This can be of an advantage for an LSR or RTV application since residual material will not cure inside the dosing equipment, which would be undesirable.

Potential uses for compositions of the present invention include automotive applications, electric/electronics applications, electro and appliances, medical applications, textile applications, and other miscellaneous applications. By way of example and not limitation, automotive applications may include: distributor caps, cable bushings, loudspeaker covers, housing seals, bellows, plug seals, spark plug boots, vent flaps, grommets for weather packs, central door locker membranes, o-rings, gaskets, bushings, boots, and combined elements with thermoplastics. By way of example and not limitation, electric/electronics applications may include: sockets for antennas, terminals, plug connections, conductors (overvoltage), insulators (high voltage), housing seals, reinforced insulating hoses, vibration dampers (collectors), switch membrane covers (damp room switches), watch seals, insulating parts for hot adhesive guns, key pads for computers and telephones, anode caps, insulators and surge arresters, diaphragms, grommets, cable seals, and covers for switches. By way of example and not limitation, electro and appliance applications may include: small seals, cable bushings, reinforced insulating hoses, lamp seals, appliance feet, membranes, o-rings, diffuser for hair dryers, gaskets for faucets, gaskets for pressure cookers, detergent seals for dish washers, parts for coffee and espresso machines, coated glass fiber hoses for electric stoves, and water diffuser for shower bath. By way of example and not limitation, medical applications may include: seals for medical appliances, syringe plungers, breast nipple protectors, base plates (dental), inflating bellows, catheters, instrument mats, sterilization mats, o-rings for dialysers, earplugs, pipette nipples, catheter holders, cannula protection sleeves, nose clamps, valves and bellows for respirators, baby bottle nipples, baby pacifiers, stoppers, respiratory masks, Foley catheters, electrodes, parts for dental applications, and parts for medical equipment. By way of example and not limitation, textile applications may include: textile coating for conveyor belts, tents, compensators and technical applications, sleeves for electrical and heat insulation, heat reflecting fabrics for steel worker's coats, airbag coating, and printing inks. By way of example and not limitation, miscellaneous applications may include: swimming goggles, snorkels and mouthpieces for snorkels, elements for sport shoes, diving masks, swimming caps, respiratory devices, photocopier rolls and butcher's gloves. All of the foregoing are intended to be exemplary uses for the compositions of the present invention and are not intended to limit the invention in any way.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

The invention claimed is:

1. A method of curing a composition by a metathesis reaction, comprising the steps of:
   (a) mixing an olefin-containing substrate, a metal carbene complex catalyst and a reaction control agent at a mixing temperature to form a mixture, wherein the catalyst is effective to initiate the metathesis reaction upon mixing, and
   wherein the reaction control agent is present in an amount sufficient to slow the progress of the metathesis reaction and to prevent the metathesis reaction from proceeding to completion in the absence of an elevated temperature above the mixing temperature, and
   wherein the olefin-containing substrate comprises at least one oligomer or polymer having a backbone of >50% linear siloxane units, the oligomer or polymer functionalized with olefin groups curable by the metathesis reaction, and wherein the at least one oligomer or polymer is selected from the group consisting of: a telechelic oligomer or polymer end-capped with the olefin groups, an oligomer or polymer tethered and end-capped with the olefin groups, a tri-functional oligomer or polymer end-capped with the olefin groups, and a quadri-functional oligomer or polymer end-capped with the olefin groups, and combinations thereof, and
   wherein the metal carbene complex catalyst has the structure:

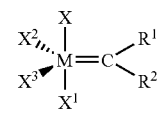

wherein:
M is ruthenium or osmium,
X is an alkylidene ligand with basicity higher than that of tricyclohexylphosphine ($PCy_3$),
$X^1$ is a neutral electron donor ligand with a basicity lower than that of tricyclohexylphosphine,
$X^2$ and $X^3$ are either the same or different and are any anionic ligand, and
$R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted; and
wherein the reaction control agent is selected from the group consisting of:
1) modified hydrocarbons containing at least one heteroatom selected from Group 14 and 15 of the periodic table, and optionally containing one or more oxygen atoms, sulfur atoms, or both, and wherein the at least one heteroatom is optionally bonded to one or more hydrocarbon fragments containing a double or triple bond, and
2) hydrocarbons containing one or more double or triple bond functional groups, and optionally containing or more oxygen atoms, sulfur atoms, or both; and
(b) prior to deactivation of the catalyst, exposing the mixture to the elevated temperature of at least 30° C. greater than the mixing temperature to accelerate the rate of the metathesis reaction to allow the reaction to proceed toward completion.

2. The method of claim 1 wherein the substrate comprises a polysiloxane tethered and end-capped with cycloalkenyl groups capable of undergoing a metathesis reaction.

3. The method of claim 2 wherein the cycloalkenyl groups are norbornenyl groups.

4. The method of claim 2 wherein the cycloalkenyl groups are norbornenylethyl groups.

5. The method of claim 1 wherein the substrate comprises a polysiloxane end-capped with cycloalkenyl groups capable of undergoing a metathesis reaction.

6. The method of claim 5 wherein the cycloalkenyl groups are norbornenyl groups.

7. The method of claim 5 wherein the cycloalkenyl groups are norbornenylethyl groups.

8. The method of claim 1 wherein $X^1$ is a phosphine, phosphite, phosphinite or phosphonite.

9. The method of claim 8 wherein $X^1$ is a phosphine of the formula $PR^3R^4R^5$ wherein $R^3$, $R^4$, and $R^5$ are each an alkyl, aralkyl or aryl.

10. The method of claim 9 wherein $X^1$ is a phosphine of the formula $PR^3R^4R^5$ wherein $R^3$, $R^4$, and $R^5$ are each n-butyl.

11. The method of claim 1 wherein $R^1$ is phenyl and $R^2$ is hydrogen.

12. The method of claim 1 wherein the X has the structure:

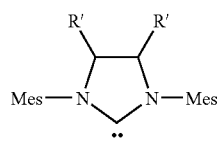

wherein Mes is mesityl and R' is hydrogen or phenyl.

13. The method of claim 1 wherein the X has the structure:

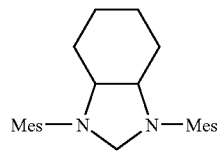

wherein Mes is miesityl.

14. The method of claim 1 wherein the catalyst has the structure:

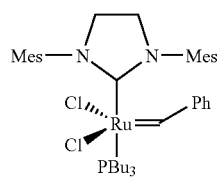

wherein Bu is butyl, Ph is phenyl and Mes is mesityl.

15. The method of claim 1 wherein the mixing step includes a group 2) reaction control agent, and the one or more functional groups are selected from an allyl group, a vinyl group, an ethynyl group or a propargyl group.

16. The method of claim 15 wherein the group 2) reaction control agent includes at least two functional groups.

17. The method of claim 15 wherein the group 2) reaction control agent includes at least three-functional groups.

18. The method of claim 15 wherein the group 2) reaction control agent further includes one or more oxygen atoms, sulfur atoms, or both.

19. The method of claim 15 wherein the group 2) reaction control agent is diallyl phthalate or glyoxal bis(diallyl acetal).

20. The method of claim 1 wherein the mixing step includes a group 1) reaction control agent containing a Group 14 heteroatom.

21. The method of claim 20 wherein the group 1) reaction control agent further includes one or more oxygen atoms, sulfur atoms, or both.

22. The method of claim 20 wherein the group 1) reaction control agent further includes one or more hydrocarbon fragments containing a group selected from an allyl group, a vinyl group, an ethynyl group or a propargyl group.

23. The method of claim 20 wherein the group 1) reaction control agent is tetraallylsilane, tetraallylstannane, tetravinylsilane, tetraallylgermane, divinyltetramethyldisiloxane, allyltrimethylsilane, ethynyltrimethylsilane, or vinyltrimethylsilane.

24. The method of claim 20 wherein the group 1) reaction control agent has the structure:

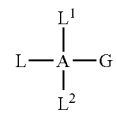

wherein:

G is selected from the group consisting of: $L^3$,

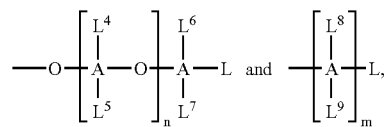

L is a hydrocarbon fragment containing a double or triple bond, $L^1$–$L^9$ are each independently selected from the group consisting of L, alkyl, aryl, aralkyl or haloalkyl, A is a Group 14 heteroatom, n=0–20, and m=0–20.

25. The method of claim 1 wherein the mixing step includes a group 1) reaction control agent containing a Group 15 heteroatom.

26. The method of claim 25 wherein the group 1) reaction control agent further includes one or more oxygen atoms, sulfur atoms, or both.

27. The method of claim 25 wherein the group 1) reaction control agent further includes one or more hydrocarbon fragments containing a group selected from an allyl group, a vinyl group, an ethynyl group or a propargyl group.

28. The method of claim 25 wherein the group 1) reaction control agent is 4-vinyl pyridine, triphenyl phosphine or tricyclohexyl phosphine.

29. The method of claim 1 wherein the mixing step is at ambient temperature and the exposing step is at the elevated temperature of at least 60° C.

30. The method of claim 29 wherein the exposing step is at the elevated temperature of at least 100° C.

31. The method of claim 1 wherein the mixing step is at a temperature at least 30° C. below ambient and the exposing step is at the elevated temperature of at least ambient temperature.

32. A method of curing a composition by a metathesis reaction, comprising the steps of:
(a) mixing an olefin-containing substrate, a ruthenium carbene complex catalyst and a reaction control agent at a mixing temperature to form a mixture,
wherein the catalyst is effective to initiate the metathesis reaction upon mixing, and
wherein the reaction control agent is present in an amount sufficient to slow the progress of the metathesis reaction and to prevent the metathesis reaction from proceeding to completion in the absence of an elevated temperature above the mixing temperature, and
wherein the olefin-containing substrate includes at least one oligomer or polymer having a backbone of >50% linear siloxane units, and the oligomer or polymer being functionalized with olefin groups curable by a metathesis reaction, wherein the at least one oligomer or polymer is selected from the group consisting of: a telechelic oligomer or polymer end-capped with the olefin groups, an oligomer or polymer tethered and end-capped with the olefin groups, a tri-functional oligomer or polymer end-capped with the olefin groups, and a quadri-functional oligomer or polymer end-capped with the olefin groups, and combinations thereof, and
wherein the ruthenium carbene complex catalyst has the formula:

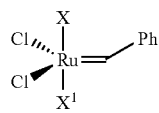

wherein Ph is phenyl, X is an alkylidene ligand having a basicity higher than that of tricyclohexylphosphine (PCy$_3$), and X$^1$ is a phosphine, phosphite, phosphinite or phosphonite having a basicity lower than that of PCy$_3$, and
wherein the reaction control agent is selected from the group consisting of:
1) modified hydrocarbons containing at least one heteroatom selected from Group 14 and 15 of the periodic table, and optionally containing one or more oxygen atoms, sulfur atoms, or both, and wherein the at least one heteroatom is optionally bonded to one or more hydrocarbon fragments containing a double or triple bond, and
2) hydrocarbons containing one or more double or triple bond functional groups, and optionally containing or more oxygen atoms, sulfur atoms, or both; and
(b) prior to deactivation of the catalyst, exposing the mixture to the elevated temperature of at least 30° C. greater than the mixing temperature to accelerate the rate of the metathesis reaction to allow the reaction to proceed toward completion.

33. The method of claim 32 wherein the olefin groups are norbornenyl groups.

34. The method of claim 32 wherein the olefin groups are norbornenylethyl groups.

35. The method of claim 32 wherein X$^1$ is a phosphine of the formula PR$^3$R$^4$R$^5$ wherein R$^3$, R$^4$, and R$^5$ are each an alkyl, aralkyl or aryl.

36. The method of claim 35 wherein X$^1$ is a phosphine of the formula PR$^3$R$^4$R$^5$ wherein R$^3$, R$^4$, and R$^5$ are each a straight chain butyl.

37. The method of claim 32 wherein the X has the structure:

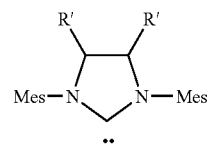

wherein Mes is mesityl and R$^1$ is hydrogen or phenyl.

38. The method of claim 32 wherein the X has the structure:

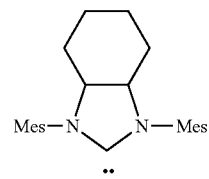

wherein Mes is mesityl.

39. The method of claim 32 wherein the mixing step includes a group 2) reaction control agent, and the one or more functional groups are selected from an allyl group, a vinyl group, an ethynyl group or a propargyl group.

40. The method of claim 39 wherein the group 2) reaction control agent includes at least two functional groups.

41. The method of claim 39 wherein the group 2) reaction control agent includes at least three functional groups.

42. The method of claim 39 wherein the group 2) reaction control agent further includes one or more oxygen atoms, sulfur atoms, or both.

43. The method of claim 39 wherein the group 2) reaction control agent is diallyl phthalate or glyoxal bis(diallyl acetal).

44. The method of claim 32 wherein the mixing step includes a group 1) reaction control agent containing a Group 14 heteroatom.

45. The method of claim 44 wherein the group 1) reaction control agent further includes one or more oxygen atoms, sulfur atoms, or both.

46. The method of claim 44 wherein the group 1) reaction control agent further includes one or more hydrocarbon fragments containing a group selected from an allyl group, a vinyl group, an ethynyl group or a propargyl group.

47. The method of claim 44 wherein the group 1) reaction control agent is tetraallyl silane, tetraallyl stannane, tetravinyl silane, tetraallyl germane divinyltetramethyldisiloxane, allyltrimethyl silane, ethynyltrimethyl silane, or vinyl trimethylsilane.

48. The method of claim 44 wherein the group 1) reaction control agent has the structure:

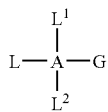

wherein:

G is selected from the group consisting of: $L^3$,

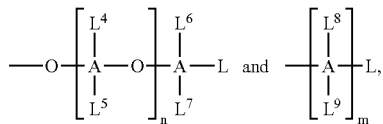

L is a hydrocarbon fragment containing a double or triple bond, $L^1$–$L^9$ are each independently selected from the group consisting of L, alkyl, aryl, aralkyl or haloalkyl, A is a Group 14 heteroatom, n=0–20, and m=0–20.

49. The method of claim 32 wherein the mixing step includes a group 1) reaction control agent containing a Group 15 heteroatom.

50. The method of claim 49 wherein the group 1) reaction control agent further includes one or more oxygen atoms, sulfur atoms, or both.

51. The method of claim 49 wherein the group 1) reaction control agent further includes one or more hydrocarbon fragments containing a group selected from an allyl group, a vinyl group, an ethynyl group or a propargyl group.

52. The method of claim 49 wherein the group 1) reaction control agent is 4-vinyl pyridine, triphenyl phosphine or tricyclohexyl phosphine.

53. The method of claim 32 wherein the mixing step is at ambient temperature and the exposing step is at the elevated temperature of at least 60° C.

54. The method of claim 53 wherein the exposing step is at the elevated temperature of at least 100° C.

55. The method of claim 32 wherein the mixing step is at a temperature at least 30° C. below ambient and the exposing step is at the elevated temperature of at least ambient temperature.

* * * * *

UNITED STATES PATENT AND TRADEMARK OFFICE
CERTIFICATE OF CORRECTION

PATENT NO. : 7,060,769 B2
APPLICATION NO. : 10/430590
DATED : June 13, 2006
INVENTOR(S) : Christos Angeletakis It is certified that error appears in the above-identified patent and that said Letters Patent is hereby corrected as shown below:

Cover page, Col. 1, Title, "METHOD OF CURING COMPOSITION" should read --METHOD OF CURING A COMPOSITION--.
Cover page, Col. 2, Abstract, line 15, "or maybe a modified" should read --or may be a modified--.
Col. 1, line 1, "METHOD OF CURING COMPOSITION" should read --METHOD OF CURING A COMPOSITION--.
Col. 18, line 59, "containing or" should read --containing one or--.
Col. 19, line 46, "miesityl" should read --mesityl--.
Col. 19, line 67, "three-functional" should read --three functional--.
Col. 21, line 56, "containing or" should read --containing one or--.

Signed and Sealed this

Tenth Day of October, 2006

JON W. DUDAS
*Director of the United States Patent and Trademark Office*